UNITED STATES PATENT OFFICE.

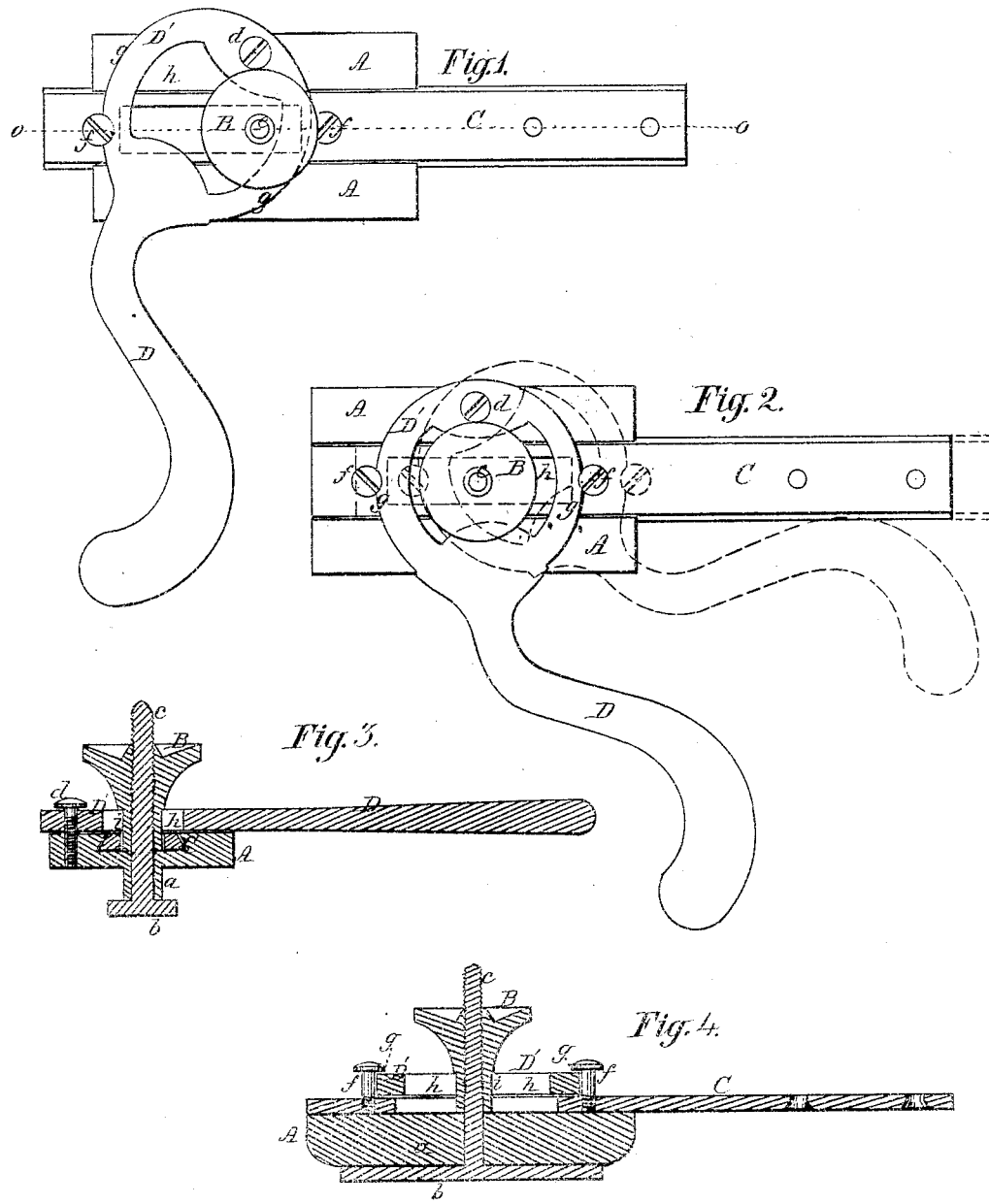

ALEXANDER ST. CLAIR, OF CEDAR RAPIDS, IOWA.

IMPROVEMENT IN FOCUSING ATTACHMENTS FOR CAMERAS.

Specification forming part of Letters Patent No. 134,402, dated December 31, 1872.

*To all whom it may concern:*

Be it known that I, ALEXANDER ST. CLAIR, of Cedar Rapids, in the county of Linn and State of Iowa, have invented a new and useful Improvement in Focusing Attachment for Photographic Cameras, which I denominate the Lightning Focusing Attachment, of which the following is a specification:

My improvement relates to devices for adjusting the focus of photographic - camera boxes; and my said improvement consists in the peculiar construction and adaptation of a lever pivoted to the bed-plate so as to operate, by a sweeping movement, the body of the camera-box, whereby the operator can control the adjustment with accuracy and speed by a single movement of the lever forward or backward, which produces a very rapid movement of the box and consequently the adjustment of the focus, which advantages are highly desirable in using the photographic camera.

In the accompanying drawing, Figure 1 represents a top view of my improved focusing attachment, the lever being at the outer limit of its sweep; Fig. 2 represents a similar view, the lever being at the limit of its inward sweep; Fig. 3, a cross-section of the bed and connecting-rod of the camera-box; and Fig. 4, a section at the line $o\ o$ of Fig. 1.

The bed-plate A is fitted by a tongue, $a$, in the center bar of the camera bed-frame and held in place by a clamp-nut, B, and clamping-plate, $b$, a screw-stem, $c$, from which passes through the bed-plate A to receive the clamp-nut. The rod or bar C is fitted in a groove in the bed-plate and connects it with the body of the camera-box, to the under side of which it is attached in the usual manner. The lever D, by which the focusing is effected, consists of a flat plate, D', having an annular form, and from which the hand-lever D extends. Its annular end rests upon and is pivoted at $d$ to the bed-plate A in a line with the junction of the lever D, and is also connected to the connecting rod or bar C by means which will communicate the sweeping movement of the lever upon its pivot $d$ to said rod and the camera-box. In the example shown this connection is made by two screws, $f f$, against the shanks of which the circular sides $g\ g$ of the lever act as eccentrics, while the heads of the screws $f f$ fit over and upon the upper side of the plate D', and thus hold it in place.

To effect this movement of the connecting-rod C the annular plate D' has a central slot or opening, $h$, to allow it to move over the stem $i$ of the clamp-nut B, the opposite curved sides $g\ g$ giving a free, full, and quick movement to the camera-box by the single backward and forward movement of the lever, which gives a sweep of three-fourths of an inch at once for a camera of 8x10 plates, or smaller, and of course any intermediate adjustment can be obtained easily and quickly, as may be desired.

In operating the camera the box is extended or closed by hand in the usual manner until the instrument is nearly in focus; the clamp-nut B is then tightened, and the focalizing adjustment effected by the lever, with the greatest possible speed, control, and convenience.

It can be applied to any camera-box in the market, large or small. It is especially calculated for gem-boxes, where clusters of tubes are focused together, to stereoscopic boxes, and to large instruments where the length of focus renders it impracticable to use the rack and pinion attached to the camera-tube.

The device is durable, and not liable to get out of order.

Having described my invention, I claim—

In a focusing attachment for photographic cameras, the combination of the slotted lever D with the bed-plate A and rod C connecting said plate and the lever with the camera-box, and operating substantially as described.

In testimony whereof I have hereunto set my hand in the presence of two witnesses this 29th day of July, A. D. 1872.

ALEXANDER ST. CLAIR.

Witnesses:
 A. V. EASTMAN,
 H. BENNETT.